United States Patent [19]
Cooper

[11] Patent Number: 5,874,910
[45] Date of Patent: *Feb. 23, 1999

[54] ANALOG SIGNAL CODING AND TRANSMISSION APPARATUS AND METHOD CAPABLE OF OPERATION WITH MULTIPLE TYPES OF ANALOG AND DIGITAL SIGNALS

[76] Inventor: J. Carl Cooper, 15288 Via Pinto, Monte Sereno, Calif. 95030

[ * ] Notice: This patent issued on a continued prosecution application filed under 37 CFR 1.53(d), and is subject to the twenty year patent term provisions of 35 U.S.C. 154(a)(2).

[21] Appl. No.: 767,075

[22] Filed: Dec. 14, 1996

Related U.S. Application Data

[62] Division of Ser. No. 310,689, Sep. 22, 1994, Pat. No. 5,592,508.

[51] Int. Cl.⁶ .................................... H03M 3/00
[52] U.S. Cl. ............................ 341/143; 341/76; 375/245
[58] Field of Search ................ 341/76, 77, 143; 375/244, 245, 249, 251

[56] References Cited

U.S. PATENT DOCUMENTS

| | | | |
|---|---|---|---|
| 3,781,686 | 12/1973 | Ching | 341/143 |
| 3,815,033 | 6/1974 | Tewksbury | 375/251 |
| 3,913,016 | 10/1975 | Candy | 341/143 |
| 4,107,610 | 8/1978 | Weber | 341/143 |
| 4,110,705 | 8/1978 | Crouse | 341/143 |
| 4,151,517 | 4/1979 | Kelley | 341/143 |
| 4,384,278 | 5/1983 | Benjamin | 341/143 |
| 4,622,537 | 11/1986 | Aiko | 341/76 |

*Primary Examiner*—Howard L. Williams
*Attorney, Agent, or Firm*—J. Carl Cooper

[57] ABSTRACT

The apparatus and method describes herein shows a system of digitizing analog or digital electronic or optical signals with very high single bit serial digital data streams which digitizing is suitable to automatically adapt the transmission of multiple types of analog and digital signals. The system is especially well suited for allowing the coupling and transmission of signals.

30 Claims, 8 Drawing Sheets

ANALOG SIGNAL CODING AND TRANSMISSION APPARATUS AND METHOD CAPABLE OF OPERATION WITH MULTIPLE TYPES OF ANALOG AND DIGITAL SIGNALS

This application is a divisional of application Ser. No. 310,689 filed Sep. 22, 1994, now U.S. Pat. No. 5,592,508.

BACKGROUND OF THE INVENTION

The invention relates to the coupling and transmission of various types of analog and digital signals, including standard analog NTSC, SECAM, PAL and HDTV signals as well as serial digital versions thereof in complex television systems. These signals may be in electronic form or optical form and in either form may take on analog or digital form. In todays television technology, it is often necessary to route or couple television signals having many different formats throughout the television facility. Because of the use of many different formats, it has heretofore been required to utilize extremely wide bandwidth analog and separate parallel digital systems and cabling. This multiplicity of required equipment and cabling causes much complexity and cost in such systems.

1. Field of the Invention

The invention relates to the field of coupling and transmision of various types of analog and digital signals, and in particular analog and digital television video, audio, ancillary and control signals.

2. Description of the Prior Art

In many television facilities, it is necessary to provide large switching and routing networks in order to couple signals from the output of one particular source to the input of another particular processor or user of the signal. To perform these functions, large routing switchers and patch matrix panels provide matrix switching of signals utilized in the television facilities. Typically matrices of 128×128 are utilized which are capable of coupling any of the 128 input to any number of the 128 outputs in a completely arbitrary manner. Matrices larger than 128×128 are also used. These large matrices require a large number of individual switches, or crosspoints, with a 128×128 router requiring 16,384 such crosspoints.

Because of the use of many different formats, it has heretofore been required to utilize separate extremely wide bandwidth analog routers for analog signals and separate parallel digital routers for digital signals, with multiple versions of each such analog or digital systems and cabling being required due to the specialized needs of each type of signal used. For example, in a television station which uses 4 audio channels, i.e. stereo for two languages, analog time code, digital time code, PAL video in analog form, NTSC video in analog form and PAL or NTSC video in digital form, to implement 128×128 routing for all of these signals would require several times the previously mentioned 16,384 crosspoints, some of which are tailored to video, some to audio, etc. This multiplicity of required equipment and cabling causes much complexity and cost in such systems.

SUMMARY OF THE INVENTION

The invention described herein utilizes an analog to digital convertor which is relatively immune to particular peculiarities of different analog signals, is suitable for use with digital signals and may be easily adjusted to accommodate changes in widely divergent types of analog or digital signals, including signals of different forms, formats, bandwidths and precision. The invention provides an analog to serial digital coder which may automatically pass and maintain already digitized signals, which coder may also automatically adjust to accommodate different bandwidth, precision or format of analog or digital signals in electronic or optical form, for example audio or video. The invention also shows a novel routing switcher which makes use of the serial digital version of the input signal to provide high quality and relatively low cost routing of signals which may signals be automatically accommodated in different forms or formats. The invention may be used to pass said signals through synchronous or asynchronous information channels. By using a single serial bit stream to convey the input signal, no matter what the input signal form, format or bandwidth, the processing, transmission and routing of the serial bit stream is the shame for all input signal types.

DESCRIPTION OF THE PREFERRED EMBODIMENT

Figure 1:
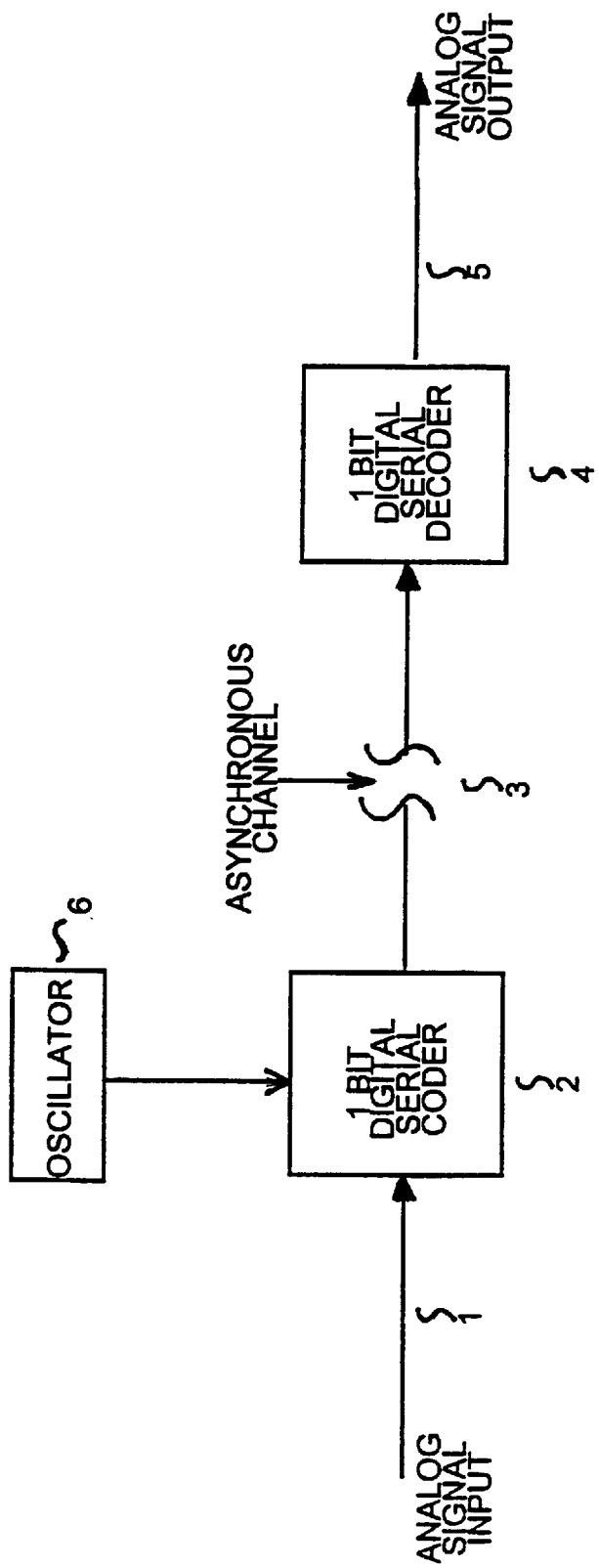
FIG. 1 is a prior art serial digital coder system as used to digitize and pass an analog signal of a single known type through an asynchronous channel.

FIG. 1 is a prior art serial digital coder system responsive to an electronic analog signal input at input 1, which electronic analog signal is of a single known type. An oscillator 6 provides a clocking signal which is used by a 1 bit digital serial coder 2 to digitize the electronic analog signal into a digital electronic serial bit stream. The serial bit stream is passed through an asynchronous channel 3 to a 1 bit digital serial decoder 4 where it is converted to an electronic analog output signal supplied on output 5. Systems of this type are commonly used to digitize a known single type of analog signal such as audio or video or other type. The systems are engineered specifically to match a particular type of electronic analog signal input, and are for the most part unable to cope with input signals of widely divergent types. It is believed for example that such systems are incapable of accepting either an analog video signal or an already digitized video signal or an analog audio signal or a digitized audio signal, all without substantial changes to the circuitry.

While the family of delta type modulators is often used for the coder 2, these prior art systems still suffer from the inability to operate with widely divergent types of signals without substantial changes to the circuitry.

Figure 2:
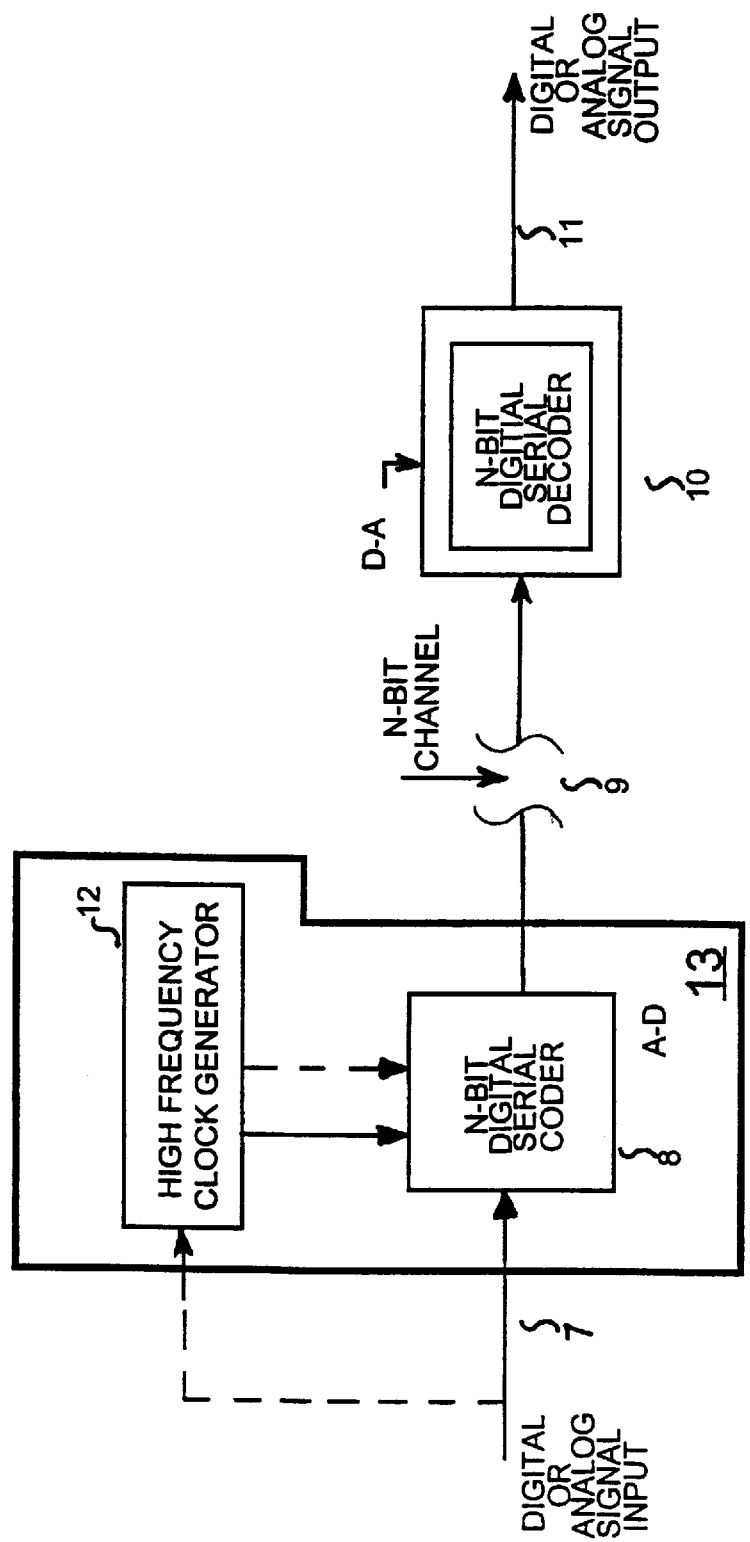
FIG. 2 is a block diagram of a first embodiment of the invention.

FIG. 2 is a block diagram of a first embodiment of the invention. While the description of FIG. 2 and the subsequent figures of the invention is made using terminology of analog and digital and signals, it should be kept in mind that the functions described may well be implemented with optical or electronic embodiments or a combination of both, there being optical equivalents for most electronic signals, for example digital optical video signal and digital electronic video signals, electronic clock generators and optical clock generators, etc. While the optical signal processing art sometimes utilizes different terminology, it will be understood that the electronic art terminology utilized herein is intended to encompass equivalent functions, devices and operations in the optical art.

FIG. 2 shows input terminal 7, analog to digital convertor 13 made up of N-bit serial coder 8 and operative to provide a serial N-Bit digital output signal for both analog and digital input signals, A-D 13 further including a high frequency clock generator 12, N-Bit serial channel 9, which may be of synchronous or asynchronous form, and D-A 10 to provide a digital or analog output signal at output terminal 11, D-A 10 including an N-Bit digital serial decoder to provide an analog signal output when an analog signal is input or a digital signal output when a digital signal is input.

It may be understood that a feature of the present invention is to facilitate the transport, coupling and use of various optical and electronic signals. The channel 9 represents many such types of transport, coupling and use, and is not specific to any particular utilization of the digital signal. It should also be noted that other methods of transmission may be utilized in channel 9, including modulated radio frequency energy and optical energy such as fiber optics, storage, such as computer or other type floppy or hard disk or optical disk or matrix. It will be apparent to one skilled in the art from the teachings herein a method and apparatus is shown for conveniently and efficiently passing or converting input signals of a variety of types into a convenient digital form. Once the input signal is available from 13 in digital form, that digital signal may be carried or utilized in any number of fashions as are well known to one skilled in the art. It should also be noted that the A-D section 13 is useful by itself, that is without any immediate reconversion of the digital signal back to its original form, for example it may be desired to simply store the digital signal from 13 for archival or storage purposes.

For the function of generating a clock, which is phase locked to a digital bit stream as provided by 12, it is preferred that the phase locking circuit be a GS9005 supplied by Gennum Corporation of Burlington, Ontario, Canada. The GS9005 receives a digital bit stream and provides a bit clock via internal PLL. In addition, if it is desired to equalize the digital bit stream due to long cable runs, a Gennum GS9004 is well suited to this application. For analog signals, it is sufficient that the clock signal be asynchronous but stable, which the Gennum part will provide if the input signal is removed. Alternatively, the functions of 12 may be implemented in a standard cell ASIC. Gallium Arsenide technology is preferred for such ASIC and the ALSI Standard cells from TriQuent Semiconductor of Beaverton, Oregon is preferred for these circuits.

It should be noted that while applicant has referred to element 13 as an A-D convertor and element 10 as a D-A convertor, that these elements actually perform differently from the same named elements which are commonly known in the art. Applicant applies a different and much broader meaning to these names, which meaning will become apparent from the teachings herein. For a broad description of these elements, one skilled in the art should understand that both digital and analog signals may be input to A-D signal 13 and both digital and analog signals may be output from D-A 10. It is important to note that one of the features of the present invention is that a given input signal may be changed to or preserved as a high frequency serial digital bit stream, this hit stream being operated on in a relatively inexpensive manner and then output in a desired form. This operation is novel including the feature that by using a single serial bit stream to convey the input signal, no matter what the input signal form, format or bandwidth, the processing, transmission and routing of the serial bit stream is the same for all input signal types.

Normally, it is preferred that the format of the output signal match the format of the input signal, for example analog in/analog out, digital in/digital out, a given format in/the same format out. It will be understood from the teachings herein, that there is nothing preventing one skilled in the art from combining functions and adding circuitry to allow mixing and conversion such that the input and output signals may very well not be the same. Although the invention is described in its preferred embodiment as having the same type and format signal input and output, it will be understood that this teaching actually pertains to having a known relationship between the input and output such that for a given input a given output may be obtained, said relationship being controllable as desired.

Figure 3:
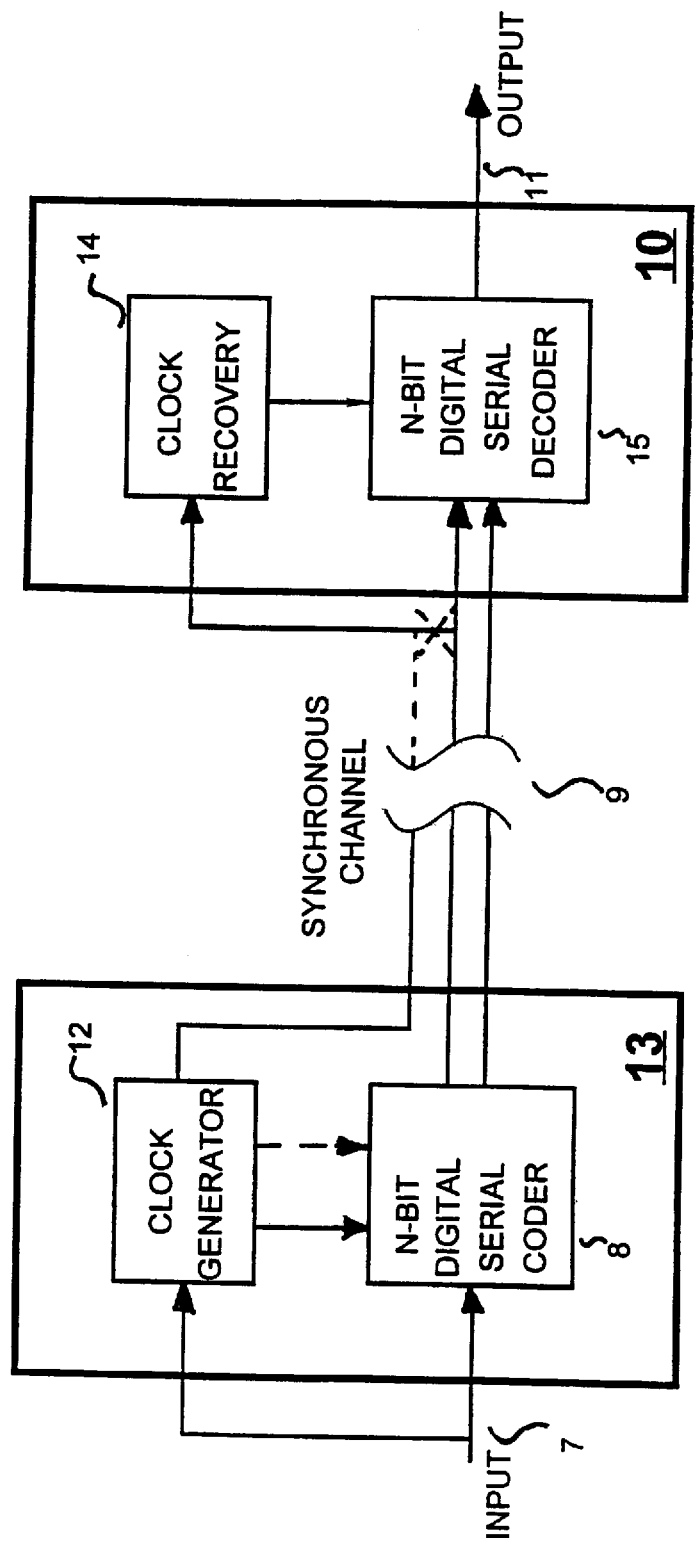
FIG. 3 is a block diagram of a second embodiment of the invention.

FIG. 3 is a block diagram of a second embodiment of the invention showing input terminal 7, analog to digital convertor 13 made up of N-bit serial coder 8 and operative to provide a serial N-Bit digital output signal for both analog and digital input signals, A-D 13 further including a high frequency clock generator 12 which is responsive to the input signal to either synchronize the clock thereto or determine the type of input signal and adjust Coder 8 in response thereto or both, the second embodiment having a synchronous N-Bit serial channel 9 which transmits the digitized input signal and may also transmit a clock signal from 12 to 14 and may also transmit signals to decoder 15 from coder 8 in response to the input signal or clock generator.

FIG. 3 further includes D-A 10 to provide a digital or analog output signal at output terminal 11, D-A 10 including an N-Bit digital serial decoder to provide an analog signal output when an analog signal is input or a digital signal output when a digital signal is input, with clock recovery circuit 14 responsive to either a clock related signal from 12 or to the digitized input signal from 8 to generate a recovered clock signal which is coupled to 15. The clock recovery circuit 14 is similar in function to clock generator 12 and is also preferred to be constructed of a Gennum GS9005.

Figure 4:
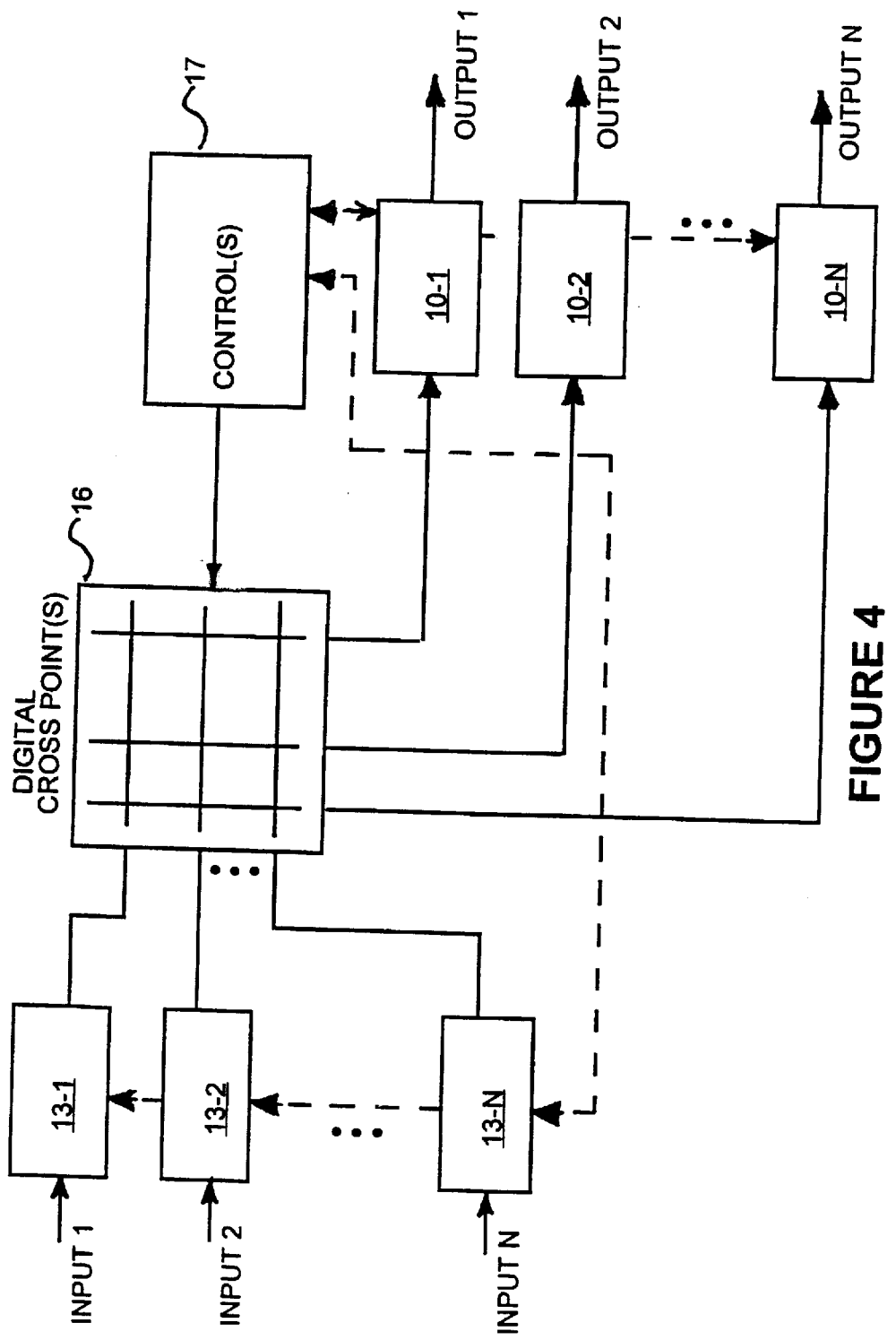
FIG. 4 is a block diagram of a routing embodiment of the invention.

FIG. 4 is a block diagram of the present invention implemented as a routing switcher configured to couple N inputs to N outputs. While the square N×N switching configuration is described, it will be understood that under the teachings herein that any switching configuration may be utilized, for example N×1, N+M× or other rectangular or polygonal configurations, including follow and break away configurations as are common in the art.

FIG. 4 shows N input A-D circuits 13-1 through 13-N, each responsive to an input signal 1-N and operating as previously described for element 13 of FIG. 2 or 3, a digital crosspoint array 16 configured to connect any of the digital data streams from 13-1 through 13-N to N outputs in any configuration, D-A convertors 10-1 through 10-N configured to receive the N digital data streams from the crosspoint array 16 and provide a digital output or analog output matching the particular input signal which is coupled to the D-A via 16 as appropriate. Crosspoint 16 is preferred to be constructed with one or more TQ8032-M 32×32 digital cross point switches provided by TriQuent Semiconductor. FIG. 4 further includes a control circuit 17 which operates to control the switching of 16 under operator or automatic operation, control 17 further controlling the A-D circuits 13 and D-A circuits 10 to allow usage of these circuits with different types of signals, for example, digital, analog, audio and video. It is preferred that control circuit 17 be implemented with a general purpose microcontroller such as the Intel 8051 series. Inclusion of LCD display and interactive devices such as keyboards and remote keypads is quite useful for many applications.

As an example, to assist in understanding the function of the control 17, it would respond to the input signal 1 via A-D 13-1 to automatically receive information of the nature of the input signal 1, for example PAL digital video, and in turn configures 13-1 for operation with this particular signal type, for example by adjusting the gain of conditioner 18 (described later), selecting phase locking of clock generator 12 to the digital data stream of 1. In addition, control 17 operates to configure any particular D-A, for example 10-2 to operate with the PAL digital video when the crosspoint connecting 13-1 to 10-2 is closed. In this manner, the D-As 10 can be quickly configured for optimum performance for each type of signal which is being sent to it from the crosspoint 16. It is preferred that control 17 perform other functions as well, such as preventing the coupling of inappropriate signal types to the outputs, preventing unused inputs from being coupled to outputs, allowing only certain input signals to be coupled to certain outputs, either on a continuous basis or on a time changing basis, and providing emergency alternate connection if a particular input should experience some difficulty, or if a higher priority input came available or active. For example, if a device capable of handling only analog NTSC signals were connected to a particular output, control 17 would operate to allow only analog NTSC signals to be coupled to that output. Of course, if a previously different signal on a given input were changed to an analog NTSC signal, it could then be automatically included in the list of signals available to that output in response and interaction with the A-D circuit.

The control 17 may also operate to facilitate conversion of the input signal from one type to another, for example from analog to digital, by configuring additional circuitry as required. A PAL digital signal might be converted to an NTSC analog signal for example, or an analog input signal might be output as a digital signal as needed.

It should be noted that only single dotted lines are shown connecting control 17 to A-D circuits 13 and D-A circuits 10, however, it will be understood that these lines represent multiple and bidirectional interconnections as required for a particular application, and as will be easily constructed by one skilled in the art from the teachings herein.

Figure 5:
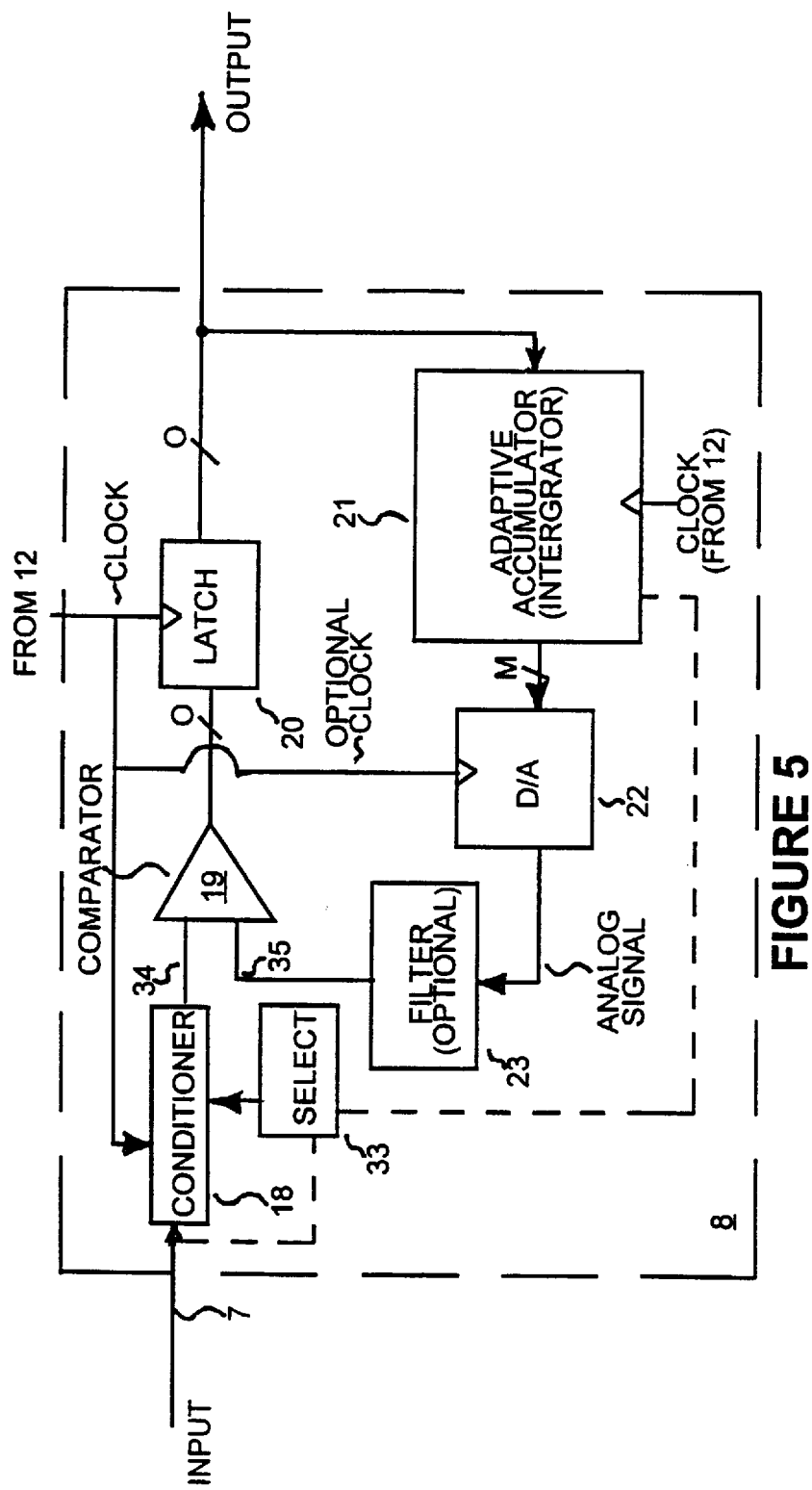
FIG. 5 is a detailed block diagram of element 8 of FIGS. 2 and 3.

FIG. 5 shows a detailed block diagram of the preferred embodiment of the N-BIT digital serial coder 8 of FIGS. 2 and 3. The input signal from input terminal 7 is coupled to a signal conditioner 13 and if desired to a selector circuit 33. The conditioner 18 buffers, adjusts the gain, equalizes, DC restores and provides other processing and conditioning of the signal as necessary as is well known to one skilled in the art. Conditioner 18 may also operate to receive an optical signal and convert it to an electrical signal by use of photo transistor or photo diode circuits as is well known in the art. It is preferred that conditioner 18 utilize a Gennum GS9004 for equalization and GS9550 for receiving and buffering digital input signals, and a Gennum GB4550A and GS4981 for receiving and buffering analog signals. Conditioner 18 also provide sample and hold function in response to the clock from 12 to output a sampled and held signal 34 for use by comparator 19 as is known in the art. It will be noted that if the rate of change of the input signal over one clock is less than 1 LSB of D/A 22 that the sample and hold function may be eliminated. In addition, the conditioner 18 may operate to provide novel adjustment the gain of the signal so that the optimum signal to noise to bandwidth ratio of analog to digital conversion may be obtained in the analog to digital conversion process. Select circuit 33 operates to detect the type of signal being input, and adjust the conditioner 18 and the adaptive accumulator parameters as desired to fit the particular signal type. The select circuit 33 may also communicate with control 17 of FIG. 4, or other control circuitry as appropriate.

FIG. 5 also shows a high speed comparator 19, preferred to be an SP93802 from Plessy Semiconductor of Scotts Valley, Calif. The comparator determines if the conditioned input signal 34 from 18 is greater or less than the reference 35 from 23. If the input is greater, a digital 1 is output and if the input is less, a digital 0 is output. While it is preferred that 19 be a one bit output device, it will be recognized by one skilled in the art that other than one bit comparators may be utilized to advantage to determine both whether the input is larger or smaller than the reference, but also how much. This capability is indicated by a width O on the output of 19 and 20. The parameter of how much greater or smaller is useful to the adaptive accumulator to change step size. The output of the comparator is latched in 20 and applied to an adaptive accumulator 21. The adaptive accumulator 21 keeps track of a number of past samples, and outputs an M bit wide digital number, which is a digital estimate of the amplitude value (in PCM like format) of the next sample of input signal from 18. It will be understood that the parameters and operation of 21 may be changed in response to a controller like 17 of FIG. 4 in order to adapt 21 to a particular input signal. This digital amplitude value is converted to an analog signal by D-A convertor 22, preferred to be a TQ6140 from TriQuent. The analog signal out of D-A 22 is filtered by 23 to remove clock energy and the resulting filtered signal is coupled as the reference to comparator 19. The filter 23 is of standard analog type as will be known to one skilled in the art, and is preferred to be supplied by Matthey Filters, available from Television Equipment Associates, Inc. of South Salem, N.Y. It will be appreciated that if there is no significant clock energy in the analog signal from 22, that filter 23 may be eliminated and the output of 22 coupled directly to 19. Digital components such as latch 20 are preferred to be implemented in standard or Gallium Arsenide 100K ECL logic such as provided by National Semiconductor of Sunnyvale, Calif.

It will be appreciated by one skilled in the art that the particular arrangement of elements shown in FIG. 5 is given by way of example, and that the elimination or rearrangement of the elements may be resorted to without departing from the spirit and scope of the invention. For example, comparators frequently contain integral latches so that latch 20 may be eliminated if 19 has an internal latch function. Elements 21 and 22 may be replaced with an analog integrator, which integrates positive and negative charges from 20 and provides an analog signal directly to 23 or 19. Other changes, which can be utilized to implement the invention in a particular form suitable for use with a particular set of input signals will be known to one of ordinary skill in the art from the teachings herein.

Figure 6:
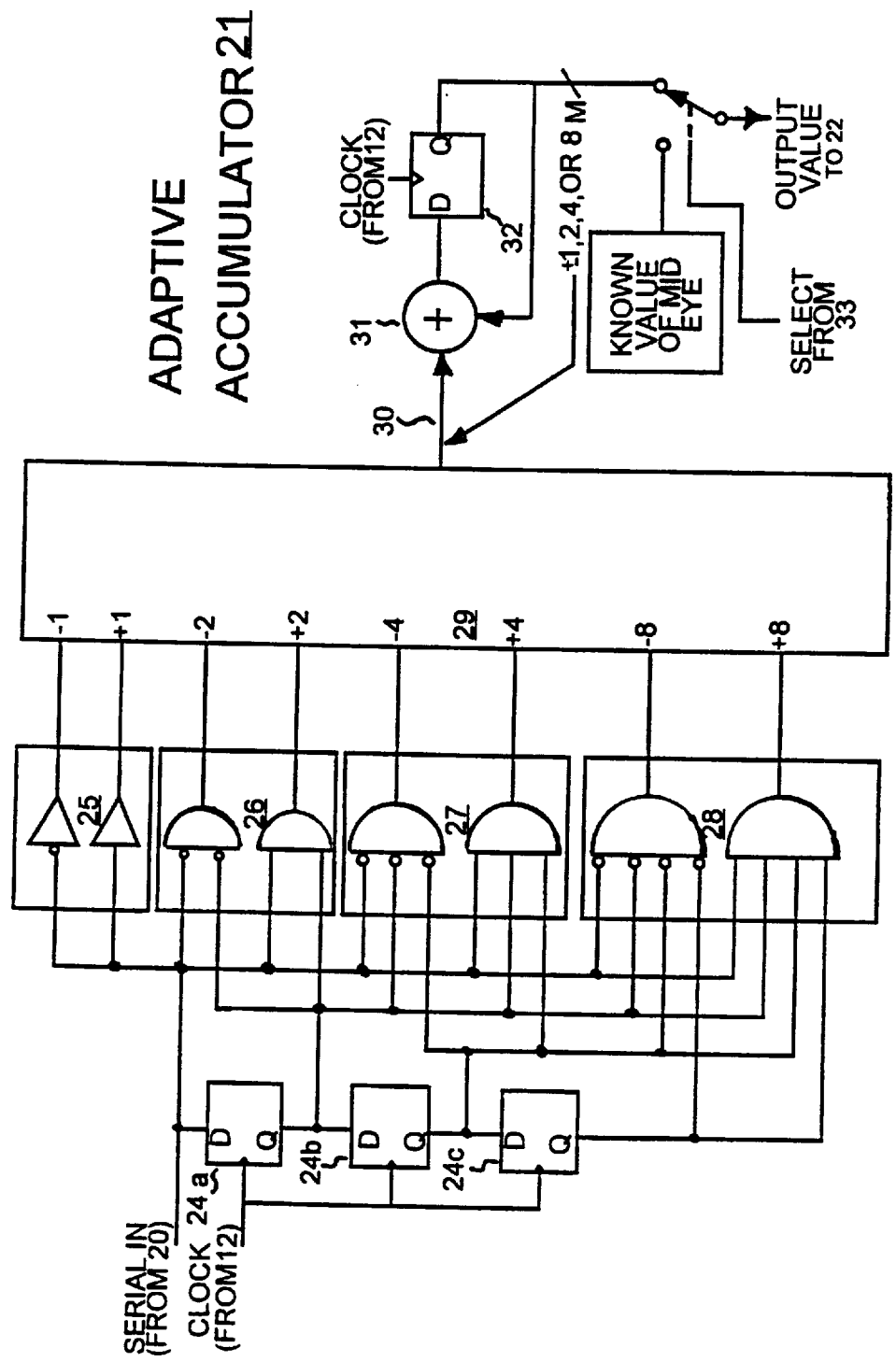
FIG. 6 is a detailed block diagram of element 21 of FIG. 5.

FIG. 6 shows a diagram of the preferred embodiment of the Adaptive Accumulator 21 of FIG. 5 which may be constructed of standard digital components preferred to be implemented in Gallium Arsenide or standard 100K ECL logic such as provided by National Semiconductor of Sunnyvale, Calif. The serial bit stream from 20 is coupled through serial shift registers 24a, 24b and 24c thus providing the previous four bits from 20 corresponding to level of the previous samples being above or below the reference. Logic 25 responds to only the first previous bit to indicate to logic 29 a need to add or subtract a 1 to the M bit number coupled to D-A 22. This need arises from the fact that the input signal sample from 18 is above or below the reference from 23. If the input is above, the reference needs to be increased and a 1 or LSB added to the reference. Similarly, logic 26 responds to only the first two previous bits to indicate to logic 29 a need to add or subtract a 2 to the M bit number coupled to D-A 22, a two being needed if the previous two bits both indicate an above or below condition of the input with respect to the reference. If the two previous bits are different, corresponding to the input signal being above the reference one period and below the other, then there would be no output from 26, as the reference would be very near the input.

Logic 27 responds to the first three previous bits to indicate to logic 29 a need to add or subtract a 4 to the M bit number coupled to D-A 22, a 4 being needed if the previous three bits all indicate the same above or below condition of the input with respect to the reference. If the three previous bits are different, corresponding to the input signal being above the reference one period and below the other, then there would be no output from 27, as the reference would be very near the input.

Logic 28, similar to 27 and 26 indicate the need to add or subtract an 8 if the previous 4 bits all indicated the same above or below condition.

Logic 29 outputs 30, the largest magnitude number to be added or subtracted as indicated by 25–28. For example, if all logic circuits indicated to add, as would be the case of all four bits from 24 and 20 were high, 29 would output +8. If all logic circuits indicated to subtract, as would be the case of all four bits from 24 and 20 were low, 29 would output −8. This largest magnitude number 30 is coupled to adder 31 where it is added to (subtracted from for negative numbers) the previous parallel output number which is held in register 32. At the next clock the new number is stored in 32. This novel circuit arrangement is similar to a type of delta modulator and has the particular characteristics of being low in cost, high in performance and particularly east to modify for use with a variety of different input signal types by simply changing the numbers which are added and subtracted as provided by 29. If it is desired to operate with high quality audio signals, it is simply accomplished by expanding the width M of the parallel output from 21 to 16, 18 or 20 bits, depending on the desired accuracy. As previously mentioned filter 23 and the sample and hold in 18 may be eliminated, this is especially true for relatively low frequency audio signals.

If the input signal is already a digital bit stream, select circuit 33 recognizes this and couples control to accumulator 21 to set a fixed reference at 19, via 22 and 23, which fixed reference is preferably set at the eye opening of the digital input signal coupled to 19. In this fashion, 19 simply acts to reclock the input digital bit stream. Select circuit 33 also operates to inform any control circuitry, such as 17 of FIG. 4, or any output circuitry, such as 10 of FIGS. 2 and 3 of the presence of digital input signal. In this fashion, the output signal may be caused to be digital, or if desired to be converted to another form for example analog. If the input signal is a parallel digital signal, a simple parallel to serial convertor may be utilized to convert the parallel digital signal to a serial digital signal. A corresponding serial to parallel convertor may be utilized in the D-A 10 if desired.

In the event where the input signal is a digital signal, it is particularly desirable to have the clocking signal provided by 12 synchronous with the bit or byte rate of the digital signal. In this event, it is desirable to have 12 phase lock the clocking signal to the input signal under command from the select circuit 33, or on its own detection of a digital input. It is preferred that the phase locking circuit be a Gennum GS9005, which receives a digital bit stream and provides a bit clock via internal PLL. In addition, if it is desired to equalize the digital bit stream due to long cable runs, a Gennum GS9004 is well suited to this application.

As previously mentioned, comparator 19 may also output both information on whether the input is greater or smaller than the reference, and information of how much greater or smaller. In this instance, a byte stream is output from 19, which byte stream may be utilized by the adaptive accumulator to change the step size. For example, if the difference is more than 1 LSB of D/A 22, the step size could be doubled. Such operation would further improve performance. It will be understood that when referring to a serial data stream or serial digital data stream, that the phrase is meant by the inventor to include both single bit streams and multiple bit streams. The terminology serial (digital) data stream is thus meant by the inventor to include a stream which is either a traditional single bit stream, as when the input signal is digital and simply passed, or is a single bit stream where the single bit indicates that the analog signal is above or below a reference, or a multiple bit stream where the information carried is indicative of an amount of deviation of the input signal above or below a reference at each clock time, where the reference is periodically changed. This should be contrasted with a parallel data stream where the multiple bit data corresponds to the input signal amplitude with respect to a fixed reference at each clock time.

In summary, the preferred embodiment of the adaptive accumulator operates with a storage mechanism responsive to the serial digital data stream to make a plurality of data (bits or bytes) of said stream simultaneously available (element 24) with a logic mechanism responsive to said plurality of data to inspect for predetermined patterns of said data (elements 25–28) and output a value 30 dependent thereon (element 29) with an arithmetic logic mechanism (elements 31 & 32) responsive to the value from 29 to add or subtract this value from a previously stored value (output of 32) and store the new value in place of the old value. This accumulated value is then compared (after being changed to analog form) to the conditioned input signal by the comparator.

Figure 7:
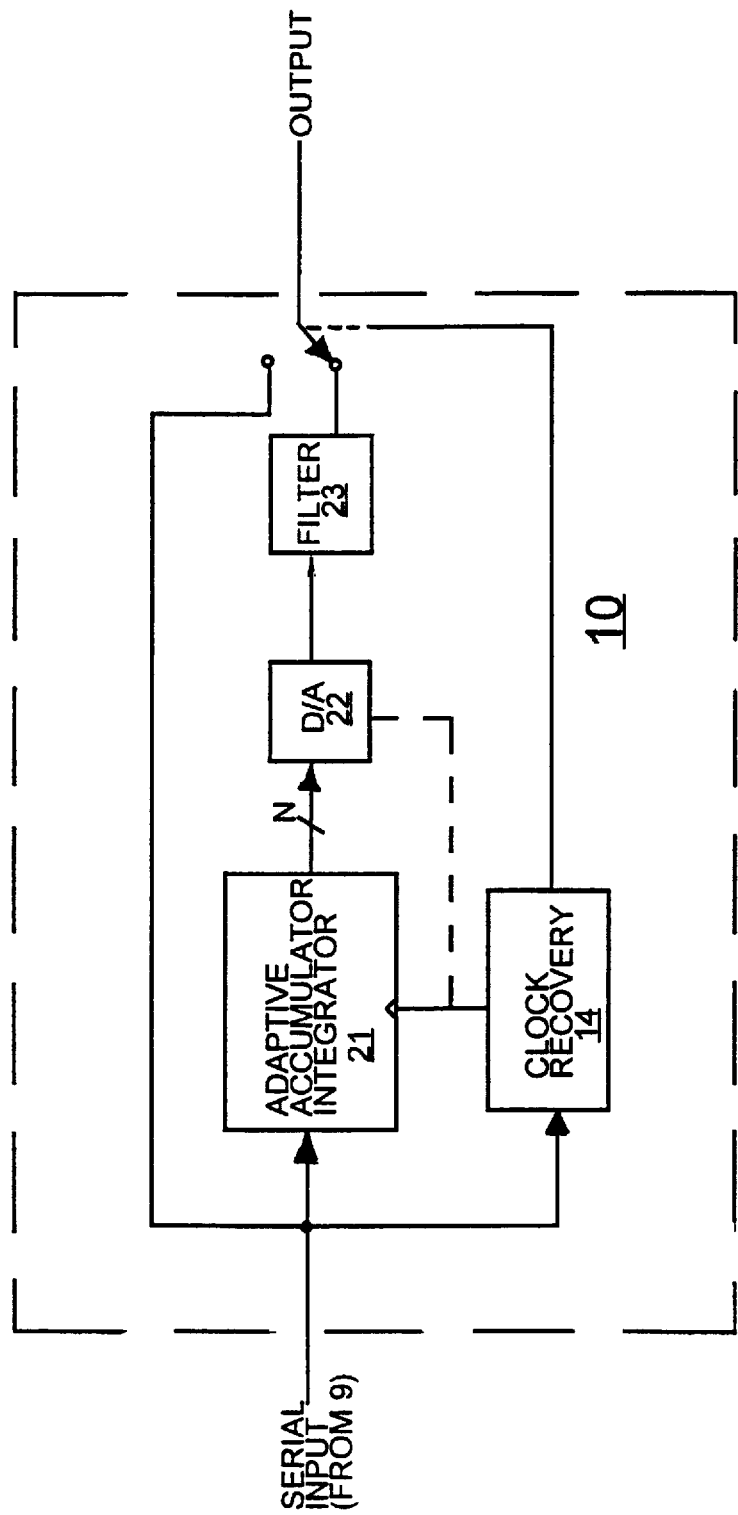
FIG. 7 is a detailed block diagram of element 10 of FIGS. 2, 3 and 4.

FIG. 7 shows the preferred embodiment of the D-A converter 10 of FIGS. 2–4. It will be recognized that FIG. 7 is comprised of some of the same components as 8 of FIG. 5, which were described above. There is a switch provided at the output to select either the analog signal from filter 23, or the digital signal from the input in response to the clock recovery circuit 14 which recognizes whether the serial input from 9 was an input analog signal encoded in delta modulation type form or was input to the A-D as a digital signal. This function is available from the suggested Gennum GS9005 as the Carrier Detect output. If the signal originated as an input analog signal, there will be no carrier detected since the delta modulation type signal does not meet the carrier characteristics of a digital video signal. Alternatively, the control circuit 17 may be coupled to the switching circuit to select either the analog or digital output.

Figure 8:
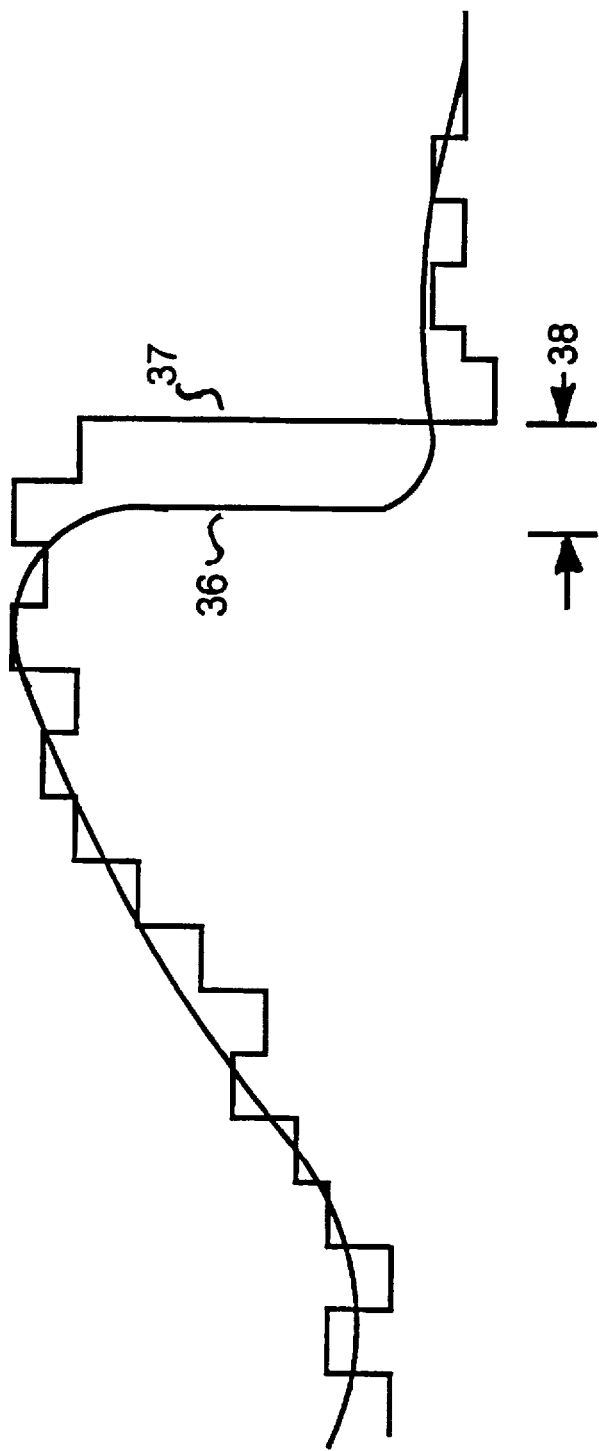
FIG. 8 is an instructive waveform representing the input signal and the reference signal of elements 19 of FIG. 5.

FIG. 8 shows an instructive waveform which represents the input signal 36, corresponding to 34, and reference signal 37, corresponding to 35, as might be seen in the circuit of FIG. 5. Note on the left that as the input signal 36 changes amplitude, that the reference signal tracks the input in 1 LSB steps. Also note that where the input signal amplitude changes by more than 1 LSB per clock step of time as in area 38, that the clock to clock amplitude change of the reference changes by increasingly larger steps until the reference catches up with the input. This increase in step size results from the operation of the circuit of FIG. 6, where subsequent data bits of the same level are output from comparator 19. It may be observed that the reference signal, and thus the reconstructed analog signal at the output, does not exactly coincide with the analog input signal. The differences create noise and distortion which is undesirable. It is thus desired to tailor the operation of the Adaptive accumulator 21 to meet the particular characteristics of the particular analog signal being digitized, which characteristics may be changed automatically or under control of the control circuitry as described above. Many engineering text books deal with delta modulation and the particular need to keep noise and distortion to a minimum, and one wishing more information on the particular design choices and parameters are referred to these texts, as the considerations for a classic delta modulator are much the same for the present circuitry.

What is claimed is:

1. An accumulator for use in a system for providing a serial digital data stream equivalent to an analog or digital electronic or optical input signal, said system including a select mechanism responsive to said input signal to cause said system to output the equivalent of said input signal when in digital form, said accumulator operative at least when said input signal is in analog form, said accumulator including in combination:

a storage mechanism responsive to said serial digital data stream to make a plurality of data of said stream simultaneously available, a logic mechanism responsive to said plurality of data to inspect for predetermined patterns of said data and output a value dependent thereon, an arithmetic logic mechanism responsive to said value to add or subtract said value from a previously stored value and store the result in place of said previously stored value.

2. An accumulator as claimed in claim 1 wherein said accumulator is responsive to said select mechanism to operate as described when said input signal is in analog form and output a known value when said input signal is in digital form.

3. An accumulator as claimed in claim 1 wherein said serial digital data stream is comprised of a stream of single magnitude bits and said arithmetic logic mechanism operates with digital logic to add or subtract said value.

4. An accumulator as claimed in claim 1 wherein said serial digital data stream is comprised of a stream of bytes comprised of a plurality of differing magnitude bits.

5. An accumulator as claimed in claim 1 wherein said logic mechanism includes a filter responsive to said plurality of data to provide a filtered output value as said output value dependent thereon.

6. An accumulator method for use in providing or receiving a serial digital data stream equivalent to an analog or digital electronic or optical input signal, said providing including a selection step responsive to said input signal to cause said providing to output the equivalent of said input signal when in digital form, said method operative to include the following steps at least when said input signal is in analog form:

a storage step responsive to said serial digital data stream to make a plurality of data of said stream simultaneously available, a logic step responsive to said plurality of data to inspect for predetermined patterns of said data and output a value dependent thereon, an arithmetic step responsive to said value to add or subtract said value from a previously stored value and store the result in place of said previously stored value.

7. A method as claimed in claim 6 wherein said method is responsive to the type of said input signal to operate as described when said input signal is in analog form and output a known value when said input signal is in digital form.

8. A method as claimed in claim 6 wherein said serial digital data stream is comprised of a stream of single magnitude bits and said arithmetic step operates with digital logic to add or subtract said value.

9. A method as claimed in claim 6 wherein said serial digital data stream is comprised of a stream of bytes comprised of a plurality of differing magnitude bits.

10. A method as claimed in claim 6 wherein said logic step includes a filter step responsive to said plurality of data to provide a filtered output value as said output value dependent thereon.

11. A method of converting an input signal to a serial stream of digital data values from which a signal equivalent to said input signal may be generated, wherein each said data value may be a bit or a byte, and said input signal is an electronic or optical signal which may change between analog and digital form, said method including the steps of;

a) defining a clock interval during which each one of said digital data values is determined, b) at least when said input signal is in analog form, for each clock interval of a), providing a set of known ones of said data values which have already been determined, c) at least when said input signal is in analog form, generating a magnitude value in response to each said set of step b) and in further response to one or more previous magnitude value thereby providing a combination signal, d) at least when said input signal is in analog form, for at least one said clock interval of a), comparing said combination signal to said input signal thereby providing one of said digital data values, e) responding to said input signal in digital form to provide said digital data values.

12. A method as claimed in claim 11 wherein step c) includes a filter step responsive to said set to provide said magnitude value.

13. A method as claimed in claim 11 wherein in step b) a known number of said digital data values of said stream of digital data values is temporarily stored in a digital memory thereby simultaneously making available a number of stored digital data values from which said set is selected.

14. An apparatus responsive to a digital input signal and providing an analog or digital output signal including in combination:

a demodulation circuit responsive to said input signal at least when said input signal represents an analog signal encoded in delta modulation type form and operative to provide an analog equivalent of said input signal, a select circuit which may be part of said demodulation circuit, responsive to a characteristic of said input signal and operative to signify when said input signal represents an analog signal encoded in delta modulation type form, an output circuit responsive to said recognition circuit and operative to provide said analog equivalent as said output signal when said input signal represents an analog signal encoded in delta modulation type form or to provide the equivalent of said input signal in digital form otherwise.

15. An apparatus as claimed in claim 14 wherein said select circuit is directly responsive to said input signal and operative to determine if said input signal represents an analog signal encoded in delta modulation type form.

16. An apparatus as claimed in claim 14 wherein said select circuit is responsive to said input signal and operative to determine if said input signal represents an analog signal encoded in delta modulation type form, with said apparatus further including a clock circuit to recover a clock signal from said input signal when it does not represent an analog signal encoded in delta modulation type form.

17. A system for providing an output signal in response to an input electronic or optical signal which may be in analog or digital form, including in combination:
   a) a circuit indicating whether said input signal is in analog or digital form;
   b) a circuit responsive to a) to digitize said input signal when in analog form and to provide said output signal in response to said digitized input signal;
   c) a circuit, part or all of which may be included in a) or b) above, responsive to said input signal in digital form to output the equivalent thereof as said output signal.

18. A system for providing an output signal from an input electronic or optical signal which may be in analog or digital form, including in combination:
   a) a clock circuit providing a clock signal;
   b) a circuit responsive to said input signal when in analog form to digitize said input signal and providing said output signal in response to said digitized input signal;
   c) a circuit, which may be part of a) or b) above for determining if said input signal is an analog or digital signal and causing b) to operate with said input signal at least when in analog form, and further causing said input signal to be coupled to provide said output signal when said input signal is in digital form.

19. A system as claimed in claim 17 or 18 wherein said output signal is always in digital form.

20. A system as claimed in claim 17 or 18 wherein said output signal is in digital form when said input signal is in digital form.

21. A system as claimed in claim 17, or 18, wherein when said input signals is in analog form it is periodically sampled as part of providing said output signal.

22. A system as claimed in claim 21 wherein said periodic sampling is responsive to said input signal.

23. A system as claimed in claim 17, or 18 further including:
   d) a comparison circuit comparing said input signal in analog form to a reference with the result thereof periodically sampled as part of providing said output signal.

24. A system as claimed in claim 23 wherein said periodic sampling is responsive to said input signal.

25. A system as claimed in claim 17, or 18 further including:
   d) a comparison circuit which compares said input signal in analog form to a reference, with the result of said comparison being periodically sampled and quantized to provide said output signal.

26. A system as claimed in claim 17, or 18 further including:
   d) a comparison circuit to compare said input signal in analog form to a reference, with the result of said comparison to a reference being periodically sampled and quantized to provide said output signal;
   e) a reference circuit responsive to the comparison of d) to provide said reference.

27. A system as claimed in claim 17, or 18 wherein when said input signal is in digital form said output signal is in the same digital format as said digital input signal.

28. A system as claimed in claim 17, or 18 wherein when said input signal is in digital form said output signal is in a different digital format than said digital input signal.

29. A system as claimed in claim 17, or 18 wherein when said input signal is in analog form said output signal is in the same digital format as the expected format of said input signal when it is in digital form.

30. A device for providing a serial digital bit stream output which is representative of an input signal which may be in analog or digital form including:
   a) a select circuit responsive to said input signal to provide a select signal in response to the analog or digital form of said input signal;
   b) an analog to serial digital coder responsive to said select circuit and to said input signal to convert said input signal in analog form to said serial digital bit stream and to automatically pass said input signal in digital form as said serial digital bit stream.

* * * * *